United States Patent [19]

Okada

[11] Patent Number: 4,752,069
[45] Date of Patent: Jun. 21, 1988

[54] VIDEO GAME WHICH INSTRUCTS THE USER HOW TO PLAY

[75] Inventor: Kazuo Okada, Tokyo, Japan

[73] Assignee: Kabushiki Kaisha Universal, Tochigi, Japan

[21] Appl. No.: 906,688

[22] Filed: Sep. 11, 1986

Related U.S. Application Data

[63] Continuation of Ser. No. 723,935, Apr. 16, 1985, abandoned.

[30] Foreign Application Priority Data

Apr. 16, 1984 [JP] Japan .................. 59-54779

[51] Int. Cl.⁴ ............................. A63F 9/00
[52] U.S. Cl. .................... 273/1 GC; 273/1 GE; 273/1 E; 273/DIG. 28
[58] Field of Search ............. 273/1 E, 1 GC, 1 GE, 273/85 G, 138 A, DIG. 28; 434/43, 69

[56] References Cited

U.S. PATENT DOCUMENTS

4,366,960  1/1983  Bromley et al. ............ 273/85 G
4,475,132  10/1984  Rodesch ..................... 434/43

FOREIGN PATENT DOCUMENTS

2062425  5/1981  United Kingdom .

*Primary Examiner*—Maryann Lastova
*Attorney, Agent, or Firm*—Young & Thompson

[57] ABSTRACT

A video game apparatus has a display device for displaying visual images showing the progress of the game. An operating member is manipulated by the player in accordance with instructions displayed on a video screen within a period of time and preferably also in a preset direction, which must fall within that preset time and be in that preset direction if the player is to avoid loss of the game. The permissible time and preferably also the preset direction are indicated to the player by a visible mark on the video screen, such as an arrow which first appears only at the beginning of the period of time when the player can successfully manipulate the operating member, and which points in the direction in which the player must operate the operating member if the game is to continue. Alternatively, the indication is audible. If the player succeeds, then success images appear on the screen; but if the player fails, then game loss images appear on the screen.

7 Claims, 2 Drawing Sheets

VIDEO GAME WHICH INSTRUCTS THE USER HOW TO PLAY

This application is a continuation of application Ser. No. 723,935, filed Apr. 16, 1985, now abandoned.

BACKGROUND OF THE INVENTION

The present invention relates to a video game apparatus in which success or failure in the game is determined in accordance with operation by the player of an operating member while viewing a displayed image. More particularly, it relates to a video game apparatus in which the period of time during which the operating member must be acted upon is communicated to the player.

Generally, in video game apparatus, the success or failure of the game which progresses while the player views a game image displayed on a cathode ray tube or the like, is determined by whether an operation is performed within a preset permissible period of time or the operating member is moved in a preset direction.

However, with conventional video game apparatus, there is the disadvantage that the player has difficulty understanding in advance what time for operating the operating member is within the preset time or which direction of movement of the operating member is the preset direction. In view of this, in such prior art video game devices, there are some that are provided with operating instructions, for example on a panel. However, the space for mounting such a panel is restricted since a large panel would detract from ornamental design of the game apparatus. Thus, only a simple explanation can be given on such a panel. Furthermore, in practice, the actual operation may be fully understood only after the game has been tried. Therefore, the player, particularly a beginner, often plays the game without fully understanding the operation of the game and often fails for that reason and loses interest in the game.

OBJECT OF THE INVENTION

It is an object of the present invention to provide a video game apparatus with which even a beginner can retain interest in the game.

It is another object of the present invention to provide a video game apparatus in which the player is notified of the operation time and operation direction required for the operating member to be acted upon in order to win.

SUMMARY OF THE INVENTION

In order to achieve the above objects, according to the present invention, the operation timing required for the operating member to be acted upon during the game is communicated to the player together with a visual image showing the progress of the game. According to a preferred embodiment of the present invention, an arrow symbol is arranged to be displayed superposed on the game progress image for a preset time, the arrow being indicative of the operation timing and direction required for the operating member to be acted upon in order to achieve success in the game.

DETAILED DESCRIPTION OF THE INVENTION

Figure 1:
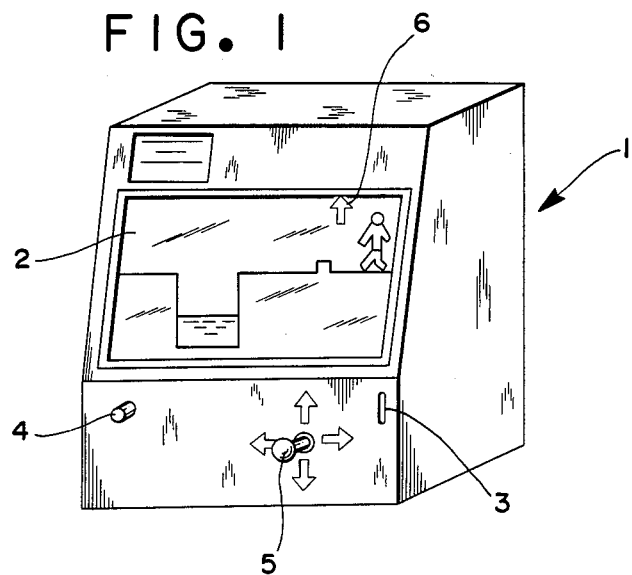
FIG. 1 is a perspective view of a video game apparatus incorporating the present invention.

Referring now to FIG. 1 wherein a video game apparatus incorporating the present invention is shown, the front face of the apparatus main body 1 has a display panel 2, such as of a cathode ray tube or a screen, for displaying a picture image for indicating the progress of the game. In addition, on the front face of the apparatus body 1, there are mounted a coin slot 3, a start button 4 for initiating a game, and an operating lever 5. The video game apparatus as above is actuated by the player by inserting a coin or token into the coin slot 3 and depressing the start button 4. The player then manipulates the operating lever 5 with a timing suitable for the stage of the game and in the proper direction, while observing the game image displayed on the display panel 2.

Figure 2A:
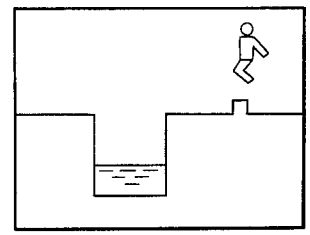
FIGS. 2A and 2B are explanatory views of a game success pattern in the video game apparatus according to the present invention.
Figure 2B:
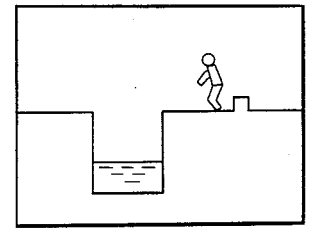
Figure 3A:
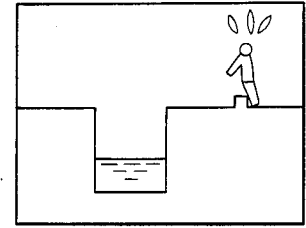
FIGS. 3A and 3B are explanatory views of a game failure pattern in the video game apparatus according to the present invention.
Figure 3B:
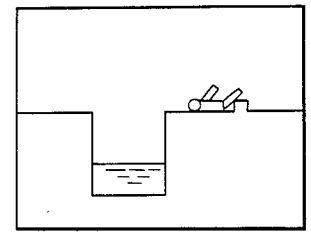

In the game as shown in FIGS. 1, 2A, 2B, 3A and 3B, as the game starts, a human character is displayed which walks from the right to theleft in the picture. If the operating lever 5 is manipulated in an up-direction within a preset permissible time from the time when the game image shown in FIG. 1 is displayed, picture images of success patterns as shown in FIGS. 2A and 2B are obtained wherein the human character jumps over an obstacle. On the other hand, if the operating lever 5 is manipulated after the preset permissible period of time or if the operating lever 5 is manipulated in a direction other than the up-direction, then picture images of failure are displayed as shown in FIGS. 3A and 3B.

The arrow 6 shown in FIG. 1 is for notifying the player of the operation timing direction. In particular, in order to achieve the success patterns shown in FIG. 2, the operating lever 5 must be manipulated within the preset permissible time and also in the predetermined direction. In this case, the arrow 6 continues to be displayed for the time when the permissible period of time starts to when the permissible time ends. Therefore, observing the game image, the player simply operates the operating lever 5 in accordance with the instruction given by the arrow 6 within the time from when the arrow 6 appears to the time when the arrow 6 disappears. Consequently, the probability of success in the game can be improved even for a beginner.

Figure 4:
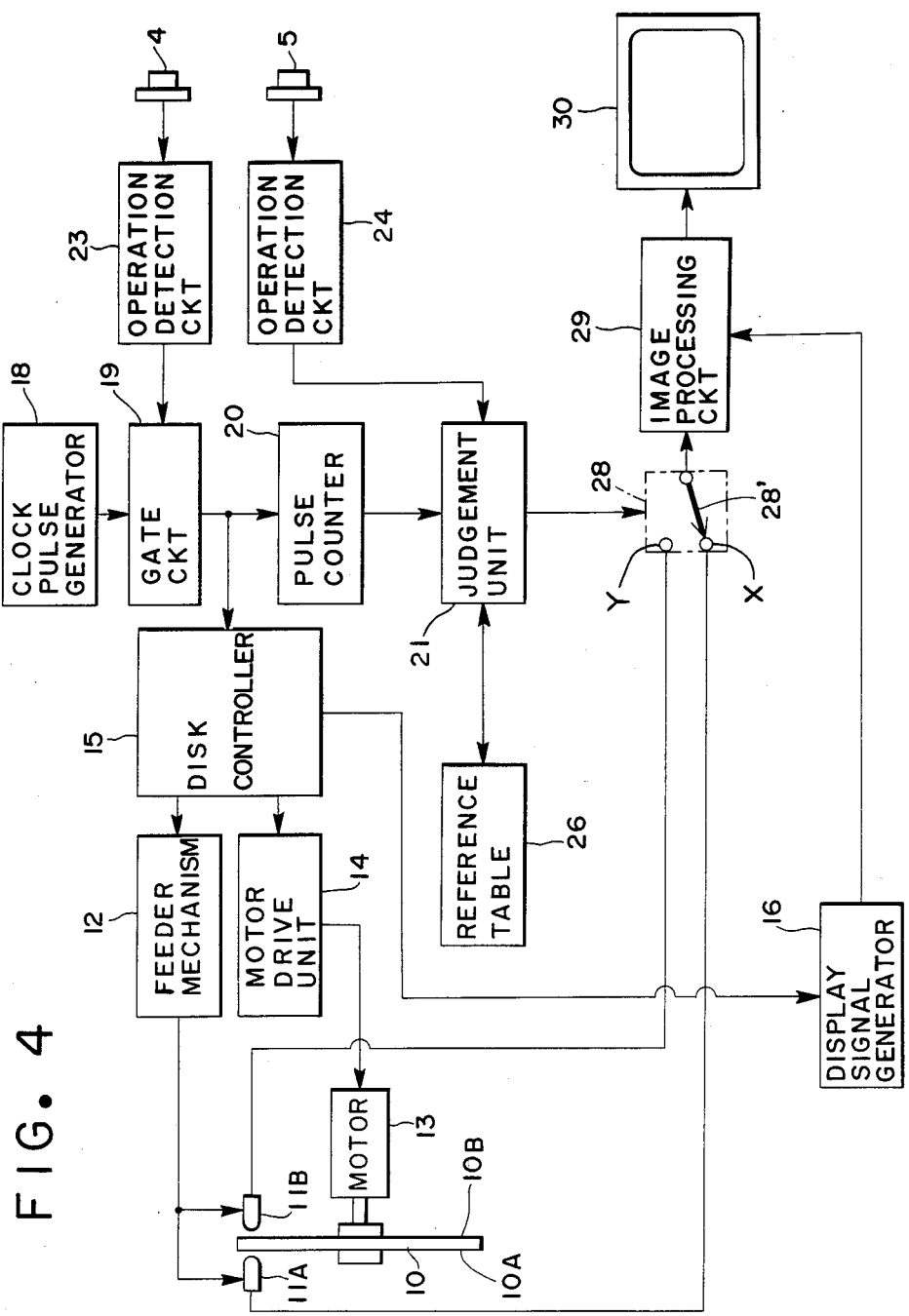
FIG. 4 is a block diagram showing the main components of the present invention.

The progress of the game as described above can be controlled with the arrangement shown in FIG. 4 by way of example. In FIG. 4, numeral 10 represents a laser disc which is driven in rotation by a motor 13. One side 10A of the laser disc 10 is provided with video signals for game success patterns as in FIGS. 2A and 2B. The other side 10B is provided with video signals for game failure patterns as in FIGS. 3A and 3B. The video signals are respectively read out by independently mounted pick-ups 11A and 11B, and transferred to terminals X and Y of a signal change-over circuit 28 to be described later.

A disc controller 15 controls a feeder mechanism 12 for moving the pick-ups 11A and 11B in the radial direction of the laser disc 10 and controls a motor drive unit 14, thereby setting the number of rotations of the laser disc 10 and controlling the feed of the pick-ups 11A and 11B. In addition, the disc controller 15 taking into consideration the desired feed of the pick-ups 11A and 11B, supplies a signal to a display signal generator at the predetermined time in the game when the operating lever 5 is to be manipulated. Upon receipt of the signal, the display signal generator 16 outputs a signal to an image processing circuit 29, to be described later, in order to display the arrow 6 (FIG. 1) at a corresponding position on the display. At every stage of the game, it often happens that the operating lever 5 will need to be manipulated several times. To this end, the display signal generator 16, containing for example read-only memories (ROMs), stores data associated with the arrow symbol suitable for each stage of the game and the display positions for the symbols. The data are sequentially used in accordance with the signal from the disc controller 15.

Clock pulses from a clock pulse generator 18 are input to the disc controller 15 and pulse counter 20 via a gate circuit 19. The gate circuit 19 is opened upon receipt of a signal from an operation detection circuit 23 which detects the depression of the start button 4. A judgment unit 21 reviews the count value of pulses from a pulse counter 20. At the time the judgment unit 21 is supplied with a signal from an operation detection circuit 24 which detects the time and direction of manipulation of the operating lever 5, the judgment unit 20 compares the operation time and direction with the stored values of a reference table 26 of ROMs.

In the reference table 26 are stored data associated with the operations the operating lever 5 must perform so as to win the game. The data include data indicative that the number of clock pulses from the time of the game start is for example within the range of 10,000 to 10,100 and data indicative that the operation direction of the operating lever 5 is an up-direction. If the operation timing and direction are not in correspondence with the data in the reference table 26, then the judgment unit 21 transmits a change-over signal to the change-over circuit 28 so that a contact 28', normally contacting the terminal X, is changed to contact the terminal Y. In case the operations of the operating lever 5 are performed several times during any stage of the game, plural data are stored in the reference table 26 similarly to the case of the display signal generator 16 as described above.

The image processing circuit 29 makes a cathode ray tube 30 display game images in accordance with video signals either from the terminal X or from the terminal Y.

With the arrangement described above, if the start button 4 is actuated, the disc controller 15 and pulse counter 20 are reset to their initial conditions. Thereafter, the gate circuit 19 is opened. Thus, clock pulses from the clock pulse generator 18 are supplied to the disc controller 15, and video signals are read out from the respective pick-ups 11A and 11B. In this case, since the terminal 28' of the change-over circuit 28 is connected to the terminal X, video signals from the pick-up 11A, i.e., video signals representative of the ordinary game pattern, are displayed on the CRT 30.

As the game progresses, if 10,000 clock pulses counted from the start of the game are supplied to the disc controller 15, it is time to operate the operating lever 5 as shown in FIG. 1. At this time, since the disc controller 15 delivers a signal to the display signal generator 16, the arrow calling for operation of the operating lever 5 in the up-direction is displayed on the CRT 30 together with the game image, until the number of clock pulses counted from the start of the game exceeds 10,100, whereupon the arrow 6 disappears.

The judgment unit 21 checks, from the start of the game, the number of pulses through the pulse counter 20 while referring to the data in the reference table 26. For the period of time after the clock pulse number reaches 10,000 and until it reaches 10,100, the judgment unit 21 judges whether the operating lever 5 has been manipulated in the preset direction or not. The count for the judgment starts when the clock pulse number reaches 10,000 and ends when it reaches 10,100.

If the operating lever 5 is operated within the above range of clock pulse numbers, the game has succeeded to that point. The pick-up 11A continues to read out the picture image (FIG. 2A and 2B) for the successful game pattern stored on the side 10A of the laser disc 10, and successively reads out video signals associated with the subsequent picture images of the game for displaying the video signals. The arrow 6 disappears when the game success pattern is displayed.

Alternatively, if the operating lever 5 is manipulated under different conditions from the contents of the data stored in the reference table 26, a change-over signal is output from the judgment unit 21 so that the contact 28' of the signal change-over circuit 28 is connected to the terminal Y. Thereupon, the pick-up 11B causes the display on the CRT 30 of the failure pattern (FIGS. 3A and 3B) stored on the other side 10B of the laser disc 10. At this time, if the time of operation of the operating lever 5 is for example within the range of 10,000 to 10,100 clock pulses but the direction of operation is other than the up-direction, then the arrow 6 disappears simultaneously with the display of the failure pattern. Of course, if the time of operation of the operating lever 5 is not within the predetermined range of clock pulses, then the arrow 6 is not displayed on the CRT as yet, or it has already disappeared.

The game progresses in the above manner. If temporary success is achieved, the game continues in the same manner, but failure terminates the game.

Although the present invention has been described in detail in connection with the embodiment shown in the drawings, modifications may be made, such as replacing the arrow 6 with other marks or messages, or displaying those representations for a very short time, for example, one second from the count start time of the judgment unit 21. Furthermore, in a game apparatus in which, instead of the operating lever 5, a push button is used, any other marks as desired may be used in place of the arrow 6. Moreover, as the signal to operate the operating lever 5, audible sounds as well as the representation on the display panel may also be used. The timing or direction of movement of the operation lever may be dispensed with as a criterion of success, in accordance with the desired degree of difficulty of the game, or the presence or absence of such a criterion may be selected by the player to make the game more interesting.

What is claimed is:

1. A video game apparatus in which visual images showing the progress of the game are displayed on a display device in accordance with video signals from a video signal generator and the success or failure of the player is determined by whether the time of operation of an operating member actuated by a player watching said images is within a preset period of time or not, which operating member is selectively operable by the player in any of a plurality of different directions, said apparatus further comprising: an image manipulated by said player operating said operating member

- operation detection means for detecting the time when said operating member is actuated;
- storing means for storing said preset time;
- judgment means for judging whether the time detected by said operation detection means is within said preset time or not; and
- information means for informing the player of the need for and the proper direction of operation of said operating member, said information means giving audible ephemeral information separate from and simultaneously with said visual images on said display device;
- said operation detection means also detecting the operation direction of said operating member, and said judgment means also judging whether the operation direction of said operating member matches a preset operation direction.

2. A video game apparatus in which visual images showing the progress of the game are displayed on a display device in accordance with video signals from a video signal detector and the success or failure of the player is determined by whether the time of operation of an operating member actuated by a player watching said images displayed on the display device is within a preset period of time or not, which operating member is selectively operable by the player in any of a plurality of different directions, said apparatus further comprising: an image manipulated by said player operating said operating member

- clock pulse generator means for supplying clock pulses to said video signal generator so as to sequentially generate video signals for displaying said visual images;
- count means for counting said clock pulses;
- operation detection means for outputting an operation signal upon the operation of said operating member;
- a reference table storing said preset time
- judgment means responsive to said operation signal for judging whether the count value of said count means corresponds to said preset period of time stored in said reference table or not; and
- information means that operates when the number of said clock pulses corresponds to a time within said preset period of time stored in said reference table to give audible ephemeral information to the player as to the need for the proper direction of operation of said operating member, said information means giving said audible ephemeral information separately from and simultaneously with said visual images on said display device.

3. The video game apparatus in which visual images showing the progress of the game are displayed on a display device in accordance with video signals from a video signal generator and the success or failure of the player is determined by whether the time of operation of an operating member actuated by a player watching said images is within a preset period of time or not, which operating member is selectively operable by the player in any of a plurality of different directions, said apparatus further comprising:

- operation detection means for detecting the time when said operating member is actuated;
- storing means for storing said preset time,
- judgment means for judging whether the time detected by said operation detection means is within said preset time or not; and
- information means for informing the player of the need for and the proper direction of operation of said operating member, said information means giving ephemeral information separate from and simultaneously with said visual images on said display device;
- said operation detection means also detecting the operation direction of said operating member, and said judgment means also judging whether the operation direction of said operating member matches a preset operation direction,
- said information means comprising mark display means, said mark display means displaying a mark together with said visual images on said display device for a predetermined time beginning with the time when said judgment means starts said judgment.

4. A video game apparatus according to claim 3, wherein said mark is an arrow indicative of said proper direction.

5. A video game apparatus according to claim 3, wherein said predetermined time is a time during which said judgment means is operating.

6. A video game apparatus in which visual images showing the progress of the game are displayed on a display device in accordance with video signals from a video signal generator and the success or failure of the player is determined by whether the time of operation of an operating member actuated by a player watching said images displayed on the display device is within a preset period of time or not, which operating member is selectively operable by the player in any of a plurality of different directions, said apparatus further comprising:

- clock pulse generator means for supplying clock pulses to said video signal generator so as to sequentially generate video signals for displaying said visual images;
- count means for counting said clock pulses;
- operation detection means for outputting an operation signal upon the operation of said operating member;
- a reference table storing said preset time;
- judgment means responsive to said operation signal for judging whether the count value of said count means corresponds to said preset period of time stored in said reference table or not; and
- information means that operates when the number of said clock pulses corresponds to a time within said preset period of time stored in said reference table to give ephemeral information to the player as to the need for and proper direction of operation of said operating member, said information means giving said ephemeral information separately from and simultaneously with said visual images on said display device;
- said information means comprising mark display means, said mark display means displaying a mark together with said visual images on said display device for a predetermined time beginning with the time when said judgment means starts said judgment.

7. A video game apparatus according to claim 6, wherein said mark is an arrow indicative of said proper direction.

* * * * *